No. 754,232. PATENTED MAR. 8, 1904.
C. M. PALMER.
WOOD DISTILLATION APPARATUS.
APPLICATION FILED DEC. 9, 1903.
NO MODEL.
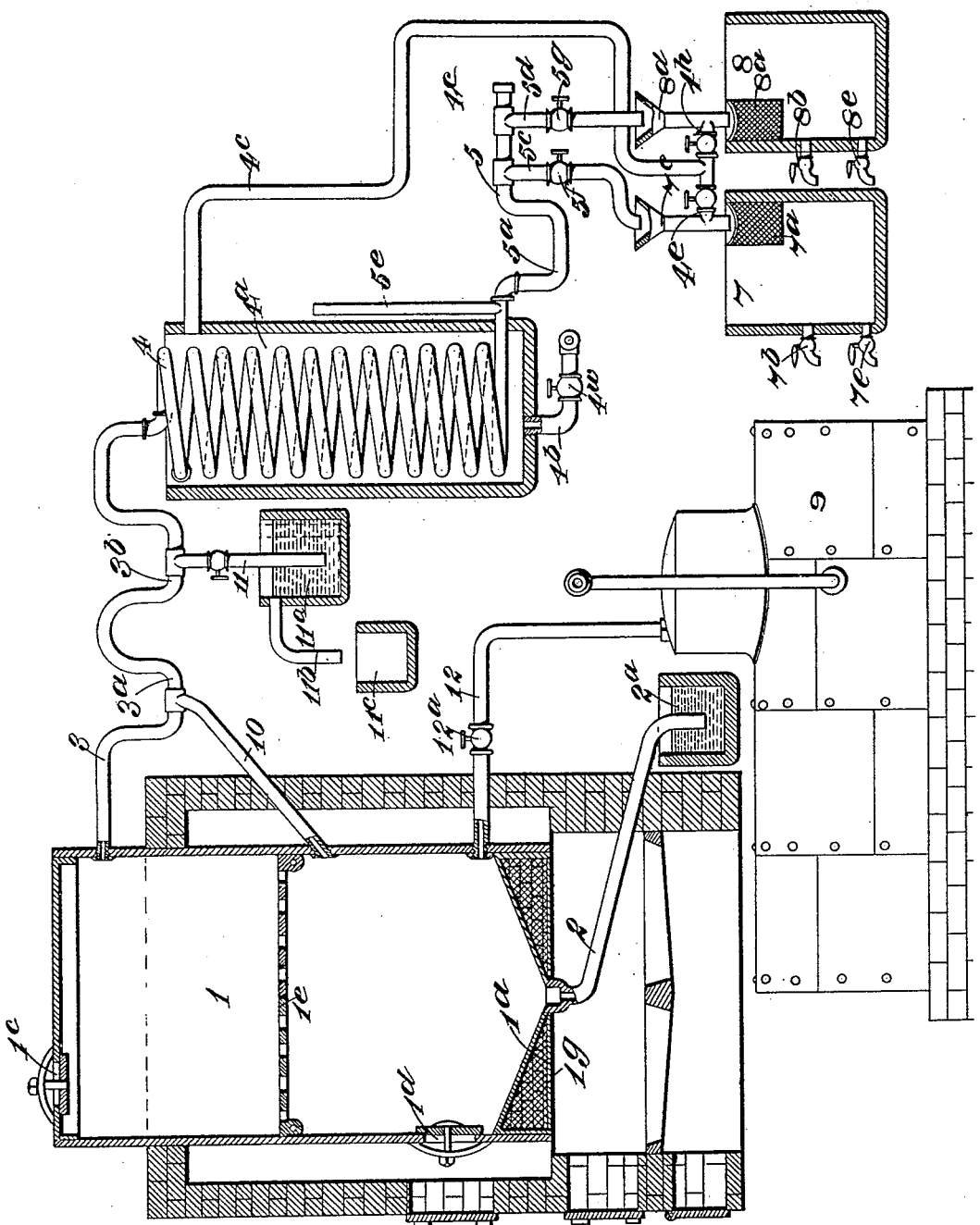
WITNESSES
INVENTOR
Charles M. Palmer.
By Alexander & Lowell
Attorneys No. 754,232. Patented March 8, 1904.

UNITED STATES PATENT OFFICE.

CHARLES MARSHALL PALMER, OF NEW LONDON, NORTH CAROLINA.

WOOD-DISTILLATION APPARATUS.

SPECIFICATION forming part of Letters Patent No. 754,232, dated March 8, 1904.

Application filed December 9, 1903. Serial No. 184,412. (No model.)

*To all whom it may concern:*

Be it known that I, CHARLES MARSHALL PALMER, of New London, in the county of Stanly and State of North Carolina, have invented certain new and useful Improvements in Wood-Distilling Apparatus; and I hereby declare that the following is a full, clear, and exact description thereof, reference being had to the accompanying drawing, which forms part of this specification.

This invention is an improved apparatus for distilling wood to obtain the essential oils, resins, and other useful products therefrom, such as turpentine, creosote, tar, &c.

The apparatus is designed to produce the various products at one continuous operation and is to be operated as hereinafter described, so that the several products may be principally separated and collected in different receivers during the operation.

The various essential novel features and characteristics of the invention will be hereinafter fully explained in describing the apparatus, which is diagrammatically illustrated in the accompanying drawing, and the several features of the invention for which protection is asked are summarized in the claims.

The retort 1 is of any suitable construction, being, preferably, a vertical iron cylinder set in a brick casing or furnace, whereby it may be heated. This retort preferably has its bottom $1^a$ covered with fire-brick $1^g$, arranged to drain the tarry products of distillation into a pipe 2, which leads to a receiver $2^a$, in which it is liquid-sealed, as shown. Access may be had to the retort through a manhole $1^c$ at top and another manhole $1^d$ at bottom, both sealed by suitable closures, as usual. Within the retort is a perforated shelf or grating $1^e$, which is preferably so constructed and arranged in any well-known or convenient manner that it can be dumped or dropped when desired, so as to discharge substances resting thereon onto the bottom of the retort.

The vapors escape from the upper part of the retort through a pipe 3, in which is a tar-trap bend $3^a$, and beyond trap $3^a$ is a second creosote-trap $3^b$, beyond which the pipe connects with the upper end of a condensing coil or worm 4 within a tank $4^a$, supplied with cold water from any suitable source through pipe $4^b$, which may be suitably valved, as shown at $4^w$. Overflow water escapes through pipe $4^c$. The bottom of worm 4 connects with a pipe 5, having a gas-vent $5^e$, beyond which is a trap $5^a$, and beyond the trap are two separate outlets $5^c$ and $5^d$, provided with valves $5^f$ and $5^g$ and respectively adapted to discharge into funnels or conductors $7^c$ and $8^d$, which respectively discharge into filters $7^a$ and $8^a$ in tanks 7 and 8. Said tanks are provided with draw-off faucets $7^e$ $8^e$ for water and $7^b$ $8^b$ for products, oils, or turpentine.

The overflow-pipe $4^c$ is connected by valved branch pipes $4^e$ and $4^h$ with the pipes $7^c$ and $8^d$, respectively, so that the waste water from the condenser, which will be more or less warmed, may be introduced into pipes $7^c$ and $8^d$ along with the oils. The water will rid the oils of much coloring-matter and impurities and tarry odors and will facilitate the work of the filters. I have found that the more thoroughly the oils are washed the better is the quality of the products.

The vapors can also escape from the retort below grating $1^e$ through pipe 10, which leads up to and connects with the trap $3^a$ and performs the double function of a gas-outlet and a return drain-pipe from trap $3^a$ into the retort.

The creosote-trap $3^b$ drains through a pipe 11 into a water-sealed receiver $11^a$, from which the creosote can overflow through a pipe $11^b$ into a receiver $11^c$. Steam may be admitted into the lower part of the retort through a pipe 12, provided with a valve $12^a$ and leading from the steam-space of the boiler 9.

The parts described are merely conventionally illustrated in the drawing in construction and arrangement, the exact size, construction, and relative location of the various parts being simply a matter of choice or selection by the designer and erector of the plant.

With a complete apparatus in working order the operation is as follows: The wood to be treated—say fat pine—is cut up into small blocks or sticks and the retort is filled therewith. Then manholes $1^c$ and $1^d$ are closed, and the valves in pipe $5^d$ may be opened. A medium fire is maintained under the retort and steam is admitted therein through pipe 12. A temperature of about 150° is maintained in the retort for from three to five hours, and the steam at this temperature thoroughly softens the wood, and the vapors generated by the distillation escape from the retort principally through pipe 3 toward the condenser 4. When the passage of the oil or turpentine is noted at the pipe $5^d$, the steam is cut off at valve $12^a$ and the temperature in the retort raised to about 250° or 350°, and this temperature is maintained until approximately all the heavier vapors and distillates are driven over and the wood is charred in the retort. As the wood chars in the retort it settles somewhat and becomes less permeable by the heat; but the vapors collecting below the grating $1^e$ can escape through pipe 10 to pipe 3, which not only carries up the vapors from the retort, but drains back into the retort from trap $3^a$ any heavy distillates carried over by pipe 3 and condensed in trap $3^a$ before reaching the creosote-trap $3^b$. By the peculiar arrangement of the apparatus most or all of the tar which may be carried over into pipe 3 is returned to the lower part of the retort, whence it escapes through pipe 2 into the tar-receptacle $2^a$, while the lighter distillates in the tar are liberated by the greater heat at the bottom of the retort and escape through pipe 10 back to pipe 3. The creosote-vapors, or the greater proportion thereof, are condensed between the trap $3^a$ and the condenser and drain back into trap $3^b$, whence they pass through pipe 11 and trap $11^a$ into the receiver $11^c$. The turpentine-vapors are condensed in the worm 4, and during the first stages of the process the lightest and best turpentine is passed into receiver 8 through pipes $5^d 8^d$, being purified and cleaned by passing through the strainer and filter $8^a$. When colors begin to appear in the turpentine escaping from pipe $5^d$, valve $5^g$ should be closed and valve $5^f$ opened, allowing the second quality of turpentine to pass into receiver 7. The warm water can be admitted into the pipes $7^c$ and $8^d$ at all stages of the distillation. After the distillation is completed the charred wood above the grate may be dumped into the lower part of the retort and removed through manhole $1^d$. I consider the arrangement of escape-pipes 3 and 10 and trap $3^a$ (pipe 10 serving as an outlet for vapors below the grate and as a return-pipe for heavier liquids) one of the principal features of the invention.

The use of a grating in the retort to sustain part of the wood during treatment and to divide the retort practically into two vapor-chambers, each having an outlet, also the introduction of warm water, which may be waste water from the condenser, to wash and free the turpentine of coloring-matter, tar, and odors, are valuable features; also the use of filters at the tops of the receiving-tanks 7 and 8.

Having thus described my invention, what I therefore claim as new, and desire to secure by Letters Patent thereon, is—

1. In an apparatus for distilling wood, &c., the combination of a retort, a transverse partition or grate therein, a condenser, a pipe leading from the upper part of the retort to the condenser and having a trap intermediate the condenser and retort, and a pipe leading upwardly and directly connecting said trap, and with the retort below the grating, substantially as described.

2. In an apparatus for distilling wood, &c., the combination of a retort, a vapor-escape pipe leading from said retort, a tar-trap in said pipe, a creosote-trap in said pipe beyond the tar-trap, and a drain-pipe leading from the tar-trap down into the retort, substantially as described.

3. In an apparatus for distilling wood, &c., the combination of a retort, a condenser, a pipe leading from the upper part of said retort to the condenser, a tar-trap in said pipe, a creosote-trap in said pipe between the tar-trap and the condenser, means for draining the creosote-trap, and a drain-pipe leading from the tar-trap down into the retort, substantially as described.

4. In an apparatus for distilling wood, &c., the combination of a retort, a transverse partition or grate therein, a pipe leading from the upper part of the retort, a tar-trap in said pipe, a creosote-trap beyond the tar-trap, a pipe leading from the tar-trap to the retort below the grating, adapted to serve as a vapor-escape pipe and as a return-pipe for draining heavy liquids in the tar-trap back into the retort.

5. In an apparatus for distilling wood, &c., the combination of a retort, a transverse partition or grate therein, a condenser adjacent to the retort, a pipe leading from the upper part of the retort to said condenser, a tar-trap in said pipe, a creosote-trap between the tar-trap and the condenser, means for draining the creosote-trap, and a pipe leading from the tar-trap to the retort below the grating, adapted to serve as a vapor-escape pipe and as a return-pipe for draining heavy liquids in the tar-trap back into the retort.

6. In an apparatus for distilling wood, &c., the combination of a retort, a condenser connected with the retort, and means for introducing warm water into the oils passing from the condenser, substantially as and for the purpose described.

7. In a wood-distilling apparatus, the combination of a retort, a condenser, vapor-pipes connecting the worm and condenser, two valved outlets from said condenser, receiving tanks into which said valved outlets respectively discharge, and filters interposed between the outlets and receiving-tanks, substantially as described.

8. In a wood-distilling apparatus, the combination of a retort, a condenser, vapor-pipes connecting the worm and condenser, an outlet-pipe from the condenser, a receiving-tank into which said outlet discharges, and a filter interposed between the outlet and tank, and means for introducing warm water into the filters along with the heavier distillates, substantially as described.

9. In an apparatus for distilling wood, &c., the combination of a retort, a condenser, a pipe leading from said retort to the condenser, a trap in said pipe between the retort and condenser, and a pipe connecting said trap with the retort at a point below the trap, said pipe serving both as a secondary gas-outlet for the retort and as a return-pipe for heavy matters in the trap; with an outlet-pipe connecting with the condenser, a receiving-tank into which said outlet discharges, and a filter interposed between said outlet and receiving-tank.

10. In an apparatus for distilling wood, &c., the combination of a retort, a condenser, a pipe leading from the upper part of said retort to the condenser, a tar-trap in said pipe, a creosote-trap in said pipe between the tar-trap and the condenser, means for draining the creosote-trap, and a drain-pipe leading from the tar-trap down into the retort, and means for introducing warm water into the lighter distillates, substantially as described.

11. In an apparatus for distilling wood, &c., the combination of a retort, a condenser, a pipe leading from the upper part of said retort to the condenser, a tar-trap in said pipe, a creosote-trap in said pipe between the tar-trap and the condenser, means for draining the creosote-trap, and a drain-pipe leading from the tar-trap down into the retort; with an outlet-pipe connecting with the condenser, a receiving-tank into which said outlet discharges, and a filter interposed between said outlet and receiving-tank.

12. In an apparatus for distilling wood, &c., the combination of a retort, a transverse partition or grate therein, a condenser adjacent to the retort, a pipe leading from the upper part of the retort to said condenser, a tar-trap in said pipe, a creosote-trap between the tar-trap and the condenser, means for draining the creosote-trap, and a pipe leading from the tar-trap to the retort below the grating, adapted to serve as a vapor-escape pipe and as a return-pipe for draining heavy liquids in the tar-trap back into the retort; with valved outlet-pipes connected with the condenser, receiving-tanks into which said outlets respectively discharge, and filters interposed between said outlets and receiving-tanks.

13. In a wood-distilling apparatus, a retort having a dumping grating or shelf, and vapor-outlets above and below the shelf, a trapped pipe connected with the upper vapor-outlet and a pipe connecting the lower outlet with the trapped pipe, substantially as described.

14. In an apparatus for distilling wood, &c., the combination of a retort, a condenser, a pipe leading from said retort to the condenser, a trap in said pipe between the retort and condenser, and a pipe connecting said trap with the retort at a point below the trap, said pipe serving both as a secondary gas-outlet from the retort and as a return-pipe for heavy matters in the trap; with valved outlet-pipes connected with the condenser, receiving-tanks into which said outlets respectively discharge, and filters interposed between said outlets and receiving-tanks, and means for introducing warm water into the filters along with the lighter products, substantially as described.

15. In an apparatus for distilling wood, &c., the combination of a retort, a transverse partition or grate therein, a condenser adjacent to the retort, a pipe leading from the upper part of the retort to said condenser, a tar-trap in said pipe, a creosote-trap between the tar-trap and the condenser, means for draining the creosote-trap, and a pipe leading from the tar-trap to the retort below the grating, adapted to serve as a vapor-escape pipe and as a return-pipe for draining heavy liquids in the tar-trap back into the retort; with valved outlet-pipes connected with the condenser, receiving-tanks into which said outlets respectively discharge, and filters interposed between said outlets and receiving-tanks, and means for introducing warm water into the filters along with the lighter products, substantially as described.

In testimony that I claim the foregoing as my own I affix my signature in presence of two witnesses.

CHAS. MARSHALL PALMER.

In presence of—
 ALBERT T. NASH,
 M. D. BROOKS.